United States Patent
Pham-Huu et al.

(10) Patent No.: US 8,628,726 B2
(45) Date of Patent: Jan. 14, 2014

(54) PHOTOCATALYSTS BASED ON STRUCTURED THREE-DIMENSIONAL CARBIDE, IN PARTICULAR β-SIC, FOAMS

(75) Inventors: Cuong Pham-Huu, Saverne (FR); Nicolas Keller, Strasbourg (FR); Marc-Jacques Ledoux, Strasbourg (FR); Valérie Keller-Spitzer, Obeschaeffolsheim (FR); Dominique Begin, Achenheim (FR); Mathieu Grandcolas, Sarrebourg (FR); Izabela Janowska, Strasbourg (FR); Shabnam Hajesmaili, Strasbourg (FR)

(73) Assignees: Centre National de la Recherche Scientifique, Paris Cedex (FR); Universite de Strasbourg, Strasbourg Cedex (FR)

(*) Notice: Subject to any disclaimer, the term of this patent is extended or adjusted under 35 U.S.C. 154(b) by 247 days.

(21) Appl. No.: 13/063,729

(22) PCT Filed: Sep. 14, 2009

(86) PCT No.: PCT/FR2009/001093
§ 371 (c)(1),
(2), (4) Date: May 9, 2011

(87) PCT Pub. No.: WO2010/029235
PCT Pub. Date: Mar. 18, 2010

(65) Prior Publication Data
US 2011/0262312 A1 Oct. 27, 2011

(30) Foreign Application Priority Data
Sep. 12, 2008 (FR) .................... 08 05021

(51) Int. Cl.
*B01J 19/08* (2006.01)

(52) U.S. Cl.
USPC ...................... 422/186.3; 422/121

(58) Field of Classification Search
USPC ............................. 422/186.3, 121
See application file for complete search history.

(56) References Cited

U.S. PATENT DOCUMENTS 6,902,653 B2 * 6/2005 Carmignani et al. ...... 422/186.3

FOREIGN PATENT DOCUMENTS

| FR | 2925356 | 6/2009 |
|---|---|---|
| JP | 2003053194 | 2/2003 |
| JP | 2004148305 | 5/2004 |
| JP | 2007098197 | 4/2007 |
| JP | 2007160273 | 6/2007 |
| WO | WO 2009098393 | 8/2009 |

OTHER PUBLICATIONS

International Search Report for International Application No. PCT/FR2009/001093, mailed on Feb. 23, 2010.

* cited by examiner

*Primary Examiner* — Kishor Mayekar
(74) *Attorney, Agent, or Firm* — McCarter & English, LLP

(57) ABSTRACT

The invention relates to a photocatalyst comprising a β-SiC cellular foam and a photocatalytically active phase, deposited directly on said cellular foam or on an intermediate phase deposited on said cellular foam. The average size of the cells is between 2500 μm and 5000 μm. The foam can comprise nanotubes or nanofibers (particularly of carbon, SiC, and $TiO_2$) that consist of, or carry as an intermediate phase, a photocatalytically active phase.

7 Claims, 2 Drawing Sheets

US 8,628,726 B2

PHOTOCATALYSTS BASED ON STRUCTURED THREE-DIMENSIONAL CARBIDE, IN PARTICULAR β-SIC, FOAMS

This application is a national stage application under 35 U.S.C. §371 and claims priority to International Application No. PCT/FR09/01093, which claims priority to French application Ser. No. 08/05021 filed on Sep. 12, 2008.

TECHNICAL FIELD OF THE INVENTION

The invention relates to photocatalysts based on structured three-dimensional foams, in particular based on cellular βSiC foams, process for producing them as well as process for using them in order to catalyze chemical reactions or the destruction of microbes, in particular for the purpose of decontaminating liquid or gaseous effluents.

PRIOR ART

Photocatalysis enables valuable chemical reactions, stimulated by light in the presence of a photocatalyst. One of the problems presented by this approach is the design of the reactor, which must allow for a large exchange surface between the reaction medium and the catalyst, low head losses in the case of continuous reactors, and high light transmission. One problem involves arranging a large illuminated exchange surface between the photocatalyst and the reaction medium.

When substrates based on paper or non-woven fabric, for example, are used, it is not possible to work with a cross-flow with large substrate thicknesses, because the head losses would be too great. To have sufficient contact between the reaction medium and the photocatalytically active phase, either large paper surfaces are used to obtain a sufficient catalytic effect (see U.S. Pat. No. 6,906,001 (Ahlstrom Research and Services) which proposes applying the photocatalyst to suspended ceiling panels of living spaces), or, and in particular for chemical engineering applications, it is necessary to work with a skimming flow.

We therefore searched for porous or structured substrates in order to increase their surface.

As an example, the patent application WO 03/037509 (SICAT, CNRS and Université Louis Pasteur) describes a process for purifying gaseous effluents using a porous photocatalyst including SiC, $TiO_2$ and $WO_3$.

The patent application WO 2006/061518 (CNRS and Université Louis Pasteur) describes a process for inactivating biological agents dispersed in a gaseous medium by a photo-activated semiconductor based on $TiO_2$ deposited on the internal surface of a reactor; this reactor has, at the interior, projections so as to increase its internal surface.

The article "Influence of the geometry of a monolithic support on the efficiency of photocatalyst for air cleaning" by M. Furman et al. (Chemical Engineering Science vol. 62, p. 5312-5316 (2007)) presents a model study of a photocatalytic reactor with a porous support. The epoxy resin support was prepared by stereolithography and TiO2 was deposited as a photocatalyst.

The documents JP 2007 160273 A (Toshiba Ceramics), JP 2003 053194 A (Seiwa Kogyo K K et al.) and JP 2007 098197 A (Bridgestone Corp.) describe the deposition of photocatalysts onto porous sintered ceramics. The document JP 2004 148305 A (Osaka Gas Co Ltd) describes the deposition of a photocatalyst onto carbon nanotubes or nanofibres deposited on porous sintered ceramics, but does not mention SiC.

The use of photocatalysts in the form of a foam, or deposited on a support in the form of a foam, is known. In particular, photocatalysts based on a $TiO_2$ foam, or $TiO_2$ catalysts deposited on a support in the form of a foam, in particular nickel and alumina, have been used. The articles "Preparation of titania foams having an open cellular structure and their application to Photocatalysis" by A. Yamamoto and H. Imai (Journal of Catalysis, vol. 226, pages 462-465 (2004)) and "The design and photoreaction kinetic modeling of a gas-phase titania foam packed bed reactor" by A. O. Ibhadon (Chemical Engineering Journal vol. 133, p. 317-323 (2007)) describe the preparation of a $TiO_2$ foam and the photocatalytic use thereof to degrade acetaldehyde and benzene or toluene, respectively.

The article "Design considerations of photocatalytic oxidation reactors using $TiO_2$-coating foam nickels for degrading indoor gaseous formaldehyde" by L. Yang et al. (Catalysis Today vol. 126, p. 359-368 (2007)) describes a reactor comprising a thin layer of $TiO_2$, with an optimal thickness of 80 nm (for an excitation wavelength of 254 nm), deposited on a nickel foam; the thickness of the nickel foam is limited to around 2 mm due to its optical absorption.

The article "Three-phase Photocatalysis using suspended titania and titania supported on a reticulated foam monolith for water purification" by I. J. Ochuma et al. (Catalysis Today, vol. 128, p. 100-107 (2007)) describes the use of a photocatalyst based on $TiO_2$, deposited by vaporization of a $TiO_2$ suspension on an alumina foam, in order to degrade DBU (1,8-diazabicyclo[5,4,0]undec-7-ene contained in an aqueous effluent.

The article "Potential of Silver Nanoparticle-Coated Polyurethane Foam as an Antibacterial Water Filter" by Prashant Jain and T. Pradeep, published on 5 Apr. 2005 in the journal Biotechnology and Bioengineering, vol. 90 (1), p. 59-62, describes the attachment of silver nanoparticles on a polyurethane foam support.

β-SiC foams, which can serve as a catalyst support, are also known. The patent application WO 2007/000506 (TOTAL S.A.) describes a process for transforming carbon monoxide and hydrogen into hydrocarbons according to the Fischer-Tropsch reaction, in which a β-SiC cellular foam is used as a catalyst support.

Metal foams are also known, and can be used as a catalyst support, but, aside from their high price and weight, they can present corrosion problems.

The problem that this invention is intended to solve is that of providing a new photocatalyst for heterogeneous catalysis, with low head losses and a large developed specific surface, and having good chemical inertia.

OBJECTIVES OF THE INVENTION

According to the invention, the problem is solved by a photocatalyst comprising a carbide cellular foam, in particular a βSiC cellular foam, and a photocatalytically active phase, deposited directly on said cellular foam or on an intermediate phase deposited on said cellular foam. The average size of the cells is between 2500 μm and 5000 μm, and preferably between 3000 μm and 5000 μm. The density thereof is advantageously between 0.1 g/cm³ and 0.4 g/cm³. The photocatalyst according to the invention can have, in the visible spectrum between 400 and 700 nm, an overall optical transmission of at least 10% for a foam with a thickness of 1.5 cm, and preferably at least 15%. Said foam can comprise nanotubes or nanofibers, which constitute, or which support as an intermediate phase, the photocatalytically active phase. Said nanotubes or nanofibers are preferably selected from carbon, SiC, $TiO_2$ and titanates. The external diameter of these nanotubes or nanofibers can be between 10 nm and 1000 nm, preferably between 10 nm and 160 nm, and even more preferably between 10 nm and 80 nm.

The photocatalytically active phase must be a semiconductor, and can be a chalcogenide (such as an oxide, sulfide or selenide). More specifically, it can be selected from the group consisting of: metal oxides such as $WO_3$, $ZnO$, $TiO_2$ and $SnO_2$; titanates, metal sulfides or selenides, optionally doped, such as CdS, CdSe, ZnS, ZnSe and $WS_2$; type III-V semiconductors, optionally doped, such as GaAs and GaP; and SiC. The semiconductor can be doped, modified at its surface or in its volume, or coupled with other materials that are advantageously semiconductors.

Another objective of the invention is a process for producing a photocatalyst based on carbon cellular foam, including the following steps:

(a) a carbonizable cellular polymer foam preform is provided with a mean cell size between 2500 μm and 5000 μm;

(b) said preform is impregnated with a carbonizable polymer resin, containing Si powder if one wishes to obtain a β-SiC foam, or another metal or metalloid;

(c) said polymer resin is polymerized;

(d) said preform and said polymerized resin are transformed into carbon;

(e) a thermal treatment is carried out at a temperature between 1200° C. and 1450° C. in order to create the carbide;

(f) a photocatalytically active phase is deposited, preferably selected from the semiconductors in the group consisting of:

metal oxides such as $WO_3$, $ZnO$, $TiO_2$ and $SnO_2$, titanates, metal sulfides or selenides, such as CdS, CdSe, ZnS, ZnSe and $WS_2$, type III-V semiconductors, such as GaAs and GaP, in which these photocatalytically active phases are optionally doped or grafted with charge transfer elements such as chromophores and/or nanoparticles ("quantum dots"), and/or a second semiconductor material absorbing in the visible or ultraviolet (UV) spectrum and capable of transferring the charge to the first semiconductor or the reverse.

Between steps (e) and (f), it is possible to deposit nanotubes or nanofibers, preferably of carbon, SiC, $TiO_2$ or titanate, in which the deposition of said SiC or $TiO_2$ nanofibers or nanotubes can optionally replace the deposition of the photocatalyst in step (f). These nanotubes or nanobfibres can also be synthesized directly onto the cellular foam.

The photocatalytically active phase can be deposited, for example, by one of the following techniques:

from a suspension of crystallized particles, preferably applied by soaking and impregnation, aerosol or droplets, by sol-gel synthesis, by deposition from a vapor phase, by deposition of successive polyelectrolyte layers, by the Langmuir-Blodgett technique.

The invention also relates to a photoreactor comprising at least one photocatalyst according to the invention. This photocatalyst advantageously includes a liquid- and gas-tight casing, at least one part of a photocatalyst according to the invention inside said casing, and at least one light radiation source. Said at least one photocatalyst part can have a ring shape.

In one embodiment, said photoreactor is characterized in that:

(a) it includes a plurality of N annular parts of a photocatalyst according to the invention, (b) said light radiation is introduced in the internal diameter of said annular parts, (c) said annular parts have an internal diameter that is alternatively different, so that all of the even-numbered parts have the same internal diameter $d_1$, and all of the odd-numbered parts have the same internal diameter $d_2$.

Said annular parts can be separated by an empty space or a part that is optically transparent to at least a portion of said light radiation used.

The invention also relates to such a photocatalyst according to the invention or such a photoreactor according to the invention for catalyzing liquid-phase chemical reactions.

Finally, the invention relates to the use of such a photocatalyst according to the invention or such a photoreactor according to the invention for inactivation or degradation of biological agents

FIGURES

FIGS. 1 to 3 illustrate embodiment of a cylindrical reactor according to the invention. In this reactor, the catalyst support has been assembled from cylindrical pieces of cellular foam according to the invention.

FIG. 1 diagrammatically shows the inside of a tubular reactor comprising a carbide cellular foam assembled from identical (a) or alternatively differently-shaped (b) cylindrical rings.

DESCRIPTION

Figure 1:
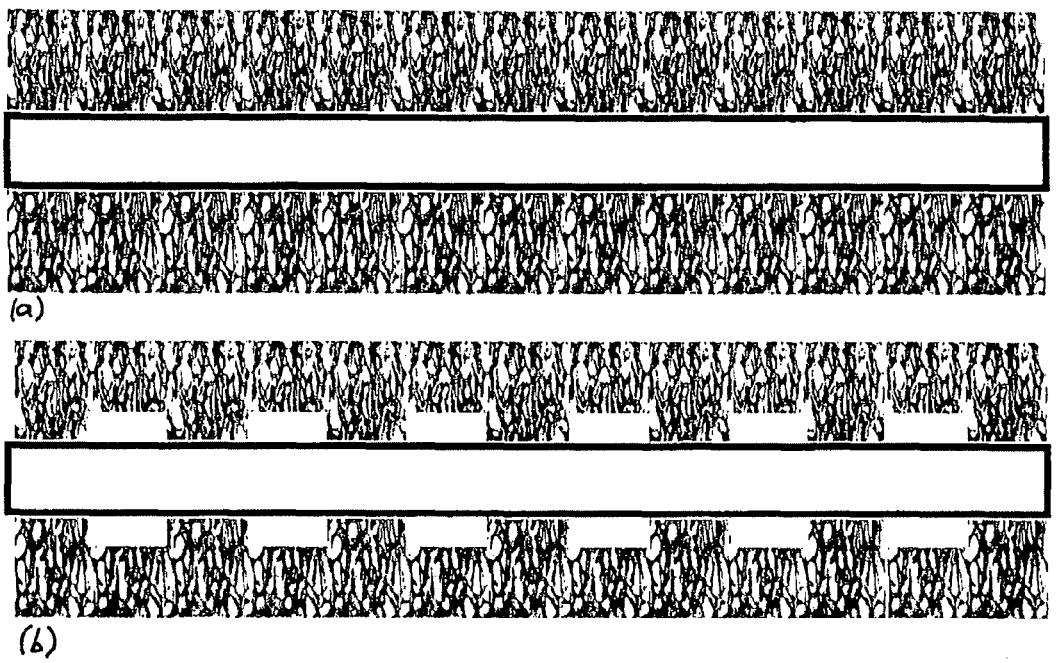

In general, in this document, the term "specific surface" refers to the so-called BET specific surface, measured according to the method of Brunauer, Emmet and Teller, well-known to a person skilled in the art, that is described in particular in stabdard NF X 11-621.

The "porosity" of a material is normally defined by reference to three categories of pores that are distinguished by their size: the microporosity (diameter lower than around 2 nm), mesoporosity (diameter between around 2 and around 50 nm) and macroporosity (diameter greater than around 50 nm).

The term "cellular foam" refers to a foam with an open porosity having both a very low density and a high porous volume. The size of the pore openings is variable and can range typically from 800 to 6000 μm. Such a foam has a very low microporosity. The mesoporosity is essentially related to the bridges that form cells. The open macroporosity of such a foam can vary from 30 to 95%, in particular 50 to 90%, and its volume density can be between 0.05 g/cm$^3$ and 0.5 g/cm$^3$.

According to the general acceptance of the term "foam", a foam is not necessarily cellular. In this more general sense of the term "foam", a foam can also simply comprise bubbles (as in metal foams or cement foams obtained by adding aluminum powders, which, by reacting with the liquid cement, form gas bubbles). Such a foam is not cellular.

In general, porous cellular foams are described by four main characteristic parameters: the size of the windows (Phi), the size of the cells (a), the size of the bridges (ds) and the porosity (epsilon); the porosity (epsilon) is equal to $1-V_s/V_{foam}$, in which $V_{foam}$ represents the volume macroscopically occupied by the foam (this volume is defined by the sides of the foam part, as if it were a solid part), and $V_s$ represents the volume of material constituting the foam part.

These four parameters are often associated in pairs: for example: phi/a=f(epsilon), or ds/a=f(epsilon.)

In general, in this document, by "biological agents", we mean biological entities, generally small, typically between 0.01 µm and 10 µm, and capable of being transported by a gaseous or liquid current. Thus, the biological agents to be inactivated according to the process of the invention can in particular be bacteria (such as bacteria of the *Legionella* genus, for example *Legionella pneumophila*), viruses, fungal spores, bacterial spores or a mixture of these entities.

By "inactivated biological agent", we mean a biological agent that has lost a biological activity, and in particular its capacity for replication or reproduction, or, in the case of a virus, its capacity for infection or contamination. Thus, inactivated bacteria is no longer capable of developing a colony after being cultured in a suitable medium, and an inactivated virus is no longer capable of being reproduced in a suitable cell.

According to the invention, the problem can be solved by using carbide, and in particular β-SiC cellular foams, which have sufficient light transmittance, very low head losses and high porosity. According to the invention, the foams must have an average cell size of between 2500 μm and 5000 μm; surprisingly, in spite of the large size of the cells, such foams have a sufficient catalytic activity. Below 2500 μm, the optical transmission of the foams becomes too low for thick-layer applications (as required in most industrial reactions). Above 5000 μm, the conversion efficacy decreases considerably.

The fact that foams with such a large cell size provide good results is surprising, both with respect to porous ceramic monoliths and with respect to cellular foams having small cells. Indeed, in consideration of the hydrodynamic factors, the use of cellular foams with a large cell size in catalysis or filtration, and in particular in photocatalysis, does not in principle appear to be beneficial.

Indeed, according to the observations of the inventors, cellular foams are beneficial in terms of performance if their four main factors are appropriately modulated. In particular:

The specific surface developed by the cellular foams is an important factor. In this invention, it is preferable to have a specifc BET surface of at least 2 $m^2/g$ and preferably of at least 5 $m^2/g$.

The filtration or impacting power of cellular foams is surprisingly important. We refer to filtration power for particles (therefore microorganisms: viruses, bacteria, spores, etc.) and impacting for chemical molecules. In general, four forces acting on this filtration or impacting power can be defined: Brownian movement, gravity, intersection forces, direct impaction forces.

The inventors have found that these forces have a greater impact for smaller bridge sizes (ds). The predominant forces dependent on: whether they are chemical molecules or microorganisms, and even whether it is a virus (for example, 40 nm in size) or bacteria (for example 1 μm×3 μm in size).

The gas-solid or liquid-solid material transfer is high. The inventors observed that, surprisingly, this material transfer improves for larger cell sizes.

The transmission of light in the foams must be high for photocatalysis applications.

Given that the various characteristic quantities are linked to one another, the gain in performance when using cellular foams in photocatalysis results in an optimization of these different parameters. This optimum is represented primarily by cellular foams of which the average cell size is between 2500 μm and 5000 μm, and more specifically between 3000 μm and 5000 μm. A specific BET surface comprised between 2 and 40 $m^2/g$, and preferably between 5 and 25 $m^2/g$, is particularly advantageous.

Another advantage of carbide cellular foams with respect to porous ceramic monoliths is that each of the four parameters (i.e. the window size (Phi), the cell size (a), the bridge size (ds) and the porosity (epsilon)) is controllable (modulable), which is not the case for monoliths.

The foams according to the invention must have a sufficient optical transmission in the visible and near-UV spectrum in order to be used as a photocatalyst or a photocatalyst support. We prefer that the overall optical transmission be at least 10% for a thickness of 1.5 cm of cellular foam and for light with a wavelength of between 400 and 700 nm.

In general, for its use as a catalytic support or catalyst in the context of this invention, below a density of 0.05 $g/cm^3$, problems of mechanical strength are encountered, while above 0.5 $g/cm^3$, the cellular porous volume will be reduced and the head losses will increase, without any functional advantage. Advantageously, the density of the cellular foam used in the context of this invention is between 0.1 and 0.4 $g/cm^3$.

Different types of cellular foams can be used for carrying out the invention.

a) Cellular Carbide Foams

Cellular carbide foams can be prepared by known methods that have been described in particular for preparing cellular β-SiC foams, known as such. A cellular carbide foam can be prepared for example by the Prin process, comprising the impregnation of a cellular polyurethane foam preform with a suspension of a powder of silicon (or of another metal or metalloid) in an organic resin (see EP 0 624 560 B1, EP 0 836 882 B1 or EP 1 007 207 A1). The thermosetting resin can be pure or diluted in an appropriate solvent, such as ethanol, acetone or another appropriate organic solvent. This allows to adjust its viscosity, which favors its mixing with the silicon powder and its penetration into the polymer foam. The thermosetting resin can be phenolic or furfurylic resin, for example.

As a polymer foam, cellular polyurethane foam is used advantageously. This foam can have an open macroscopic structure with a mean diameter selected between about 800 μm and 5000 μm. For the present invention, a carbide foam with a mean cell size comprised between 2500 μm and 5000 μm is preferred, and therefore a cellular polymer foam with a similar cell size (i.e. comprised between 2500 μm and 5000 μm, too) is used.

After infiltration, the foam can be dried in contact with ambient air. The polymerization temperature is typically comprised between 130° C. end 200° C., and the carbonization temperature between 500° C. and 900° C. A temperature of about 800° C. is particularly preferred. In a preferred embodiment, this treatment is carried out under inert atmosphere (such as argon). This leads to a carbon structure containing silicon inclusions that act as precursors for SiC. The final step is a thermal treatment that forms SiC by reaction between the carbon foam and the silicon powder. This treatment is carried out typically at a temperature comprised between 1200° C. and 1500° C. (which is particularly suitable for forming (β-SiC), preferably under a stream of inert gas such as argon. This reaction involves a gaseous oxide as a vector for the metal or metalloid, that forms by a reaction between the metal or metallid (such as Si) and the oxygen-bearing groups of the resin. The volatile oxide (such as SiO) then reacts with the carbon black and forms the carbide (such as SiC) while releasing CO. The released CO is carried away by the inert gas stream, which shifts the equilibrium of the reaction towards carbide formation.

According to an advantageous embodiment, a preform made of commercial polyurethane foam is filled with a mixture of formo-phenolic resin in which metallic silicon powder has been dispersed, forming an approximately equimolar mixture. After drying at ambient temperature and polymerization by heating at 150° C. for 2 hours, the carbide is formed by a thermal treatment at 1350° C. during several hours under argon, followed by a treatment under air at 900° C. for 2 hours.

β-SiC foam that has been prepared by the Prin process referenced above or by any other process, and having a specific surface comprised between about 2 m$^2$/g and about 40 m$^2$/g, and preferably between 5 m$^2$/g and 25 m$^2$/g, are a particularly preferred support for preparing photocatalysts according to the present invention.

A particularly preferred foam is a cellular β-SiC foam presenting a continuous, connected three-dimensional structure with variable pore sizes that are comprised between 800 μm and 500 μm, preferably between 1000 μm and 4800 μm. The open porosity (macroporosity) of this SiC foam can range from 30% to 95%, in particular from 50μ to 90%.

The morphological properties of cellular foam together with the good thermal conductivity of silicon carbide allows a high heat dissipation (which is known as such from numerous publications, see references [1], [2] and [3]) throughout the whole structure, as well as a homogenous distribution of the reactive fluid throughout the whole volume of the foam (which is known as such from references [2] and [3]).

BIBLIOGRAPHIC REFERENCES FOR THIS SECTION

[1] M. Lacroix, P. Nguyen, D. Schweich, C. Pham Huu, S. Savin-Poncet, D. Edouard "Pressure drop measurements and modelling on SiC foams." *Chemical Engineering Science*, vol. 62: 3259-3267 (2007).

[2] Groppi, G. and E. Tronconi; "Design of novel monolith catalyst supports for gas/solid reactions with heat exchange." *Chemical Engineering Science* 55(12): 2161-2171 (2000).

[3] Giani, L., G. Groppi, et al.; "Mass-Transfer Characterization of Metallic Foams as Supports for Structured Catalysts". *Ind. Eng. Chem. Res.* 44: 4993-5002 (2005).

b) Deposition of Nanofibers or Nanotubes

This deposition is optional. Nanotubes or nanofibers can be deposited on the β-SiC cellular foam, according to techniques known to a person skilled in the art. For example, they can be deposited by techniques described below under c) ("first method"), also suitable for all types of nanotubes and nanofibers.

The in situ synthesis onto the substrate, according to any suitable technique, known or novel, is however preferred.

As an example, the synthesis of nanofibres or nanotubes can be carried out as follows:

Step (i): Incorporation as a Growth Catalyst for Nanotubes or Nanofibres into the Porous β-SiC Support.

This catalyst is intended to catalyze the growth of carbon nanotubes or nanofibres. In advantageous embodiments, nickel is used, especially for obtaining carbon nanofibres, or iron, cobalt or a mixture of iron and cobalt for obtaining carbon nanotubes. Any other binary or ternary mixture of these three elements can be used, too.

We will describe here a typical embodiment for this step. The porous β-SiC support is soaked with a solution of a precursor of an active phase. An aqueous or alcoholic solution can be used. Said precursor can be a transition metal salt, such as Ni(NO$_3$)$_2$. The metal load is advantageously comprised between 0.4 weight-% and 5 weight-%, and preferably between 0.5% and 2%. After soaking, the support is oven-dried, preferably at a temperature comprised between 80° C. and 120° C. during 1 and 10 hours, and then calcined under air or inert gas at a temperature comprised between 250° and 500° C. Then the precursor of an active phase is converted into an active phase, preferably by a reduction using a reducing gas at an appropriate temperature, for example between 250° C. and 500° C. under hydrogen. The duration of this reduction is typically comprised between 0.2 hours and 3 hours.

Step (ii): Growth of Carbon Nanotubes or Nanofibres from a Mixture Comprising at Least One Hydrocarbon and Hydrogen The hydrocarbon is an aliphatic, olefinic, acetylenic or aromatic C1 to C10 hydrocarbon. The aliphatic, olefinic or acetylenic hydrocarbons can be linear or branched. Aliphatic or olefinic C1 to C4 hydrocarbons are preferred, and especially those in C2 or C3. Acetylene can also be used. When using ethane, the temperature of synthesis is advantageously chosen between 680° C. and 750° C. This leads to carbon nanofibres or nanotubes having a mean diameter of about 60 nm and a length in the order of one to several micrometers.

Among the aromatic hydrocarbons that can be used, toluene, when mixed with ferrocene, has been found by the inventors to lead to carbon nanotubes that are aligned on the β-SiC substrate. The advantageous reaction temperature is comprised between 750° C. and 850° C., and especially about 800° C. The concentration of carbon nanotubes formed in this way are determined by the duration of the synthesis and by the ferrocene concentration of the solution. Carbon nanotubes formed with ferrocene are oriented perpendicularly to the surface of the foam; their mean diameter is in the order of 80 nm, and their length can reach several tens of micrometers.

This yields carbon nanotubes or nanofibres. The obtention of SiC nanofibres requires a third step:

Step (iii): Transformation of Carbon Nanotubes or Nanofibres into SiC Nanotubes and Nanofibres In this optional step, carbon nanofibres or nanotubes react with SiO vapor in a thermal treatment vessel. SiO vapor can be produced in the thermal treatment vessel, close to the carbon structures to be converted into SiC. In one embodiment, SiO is generated by heating a mixture of Si and SiO$_2$ placed close to the carbon nanotubes or nanofibres.

The reaction temperature for the obtention of β-SiC is advantageously comprised between 1000° C. and 1500° C., preferably between 1050° C. and 1400° C., and even more preferably between 1150° C. and 1350° C.

Depending on the duration of the reaction, the conversion of carbon nanotubes or nanofibres into SiC nanofibres, and especially into β-SiC nanofibres, can be partial or complete.

The synthesis of TiO$_2$ nanotubes onto a SiC foam is described below (section (c), "sixth method").

The deposition of titanate nanotubes can be done in the same way as the deposition of TiO$_2$ nanotubes described below under c) ("first method"), which is also suitable for all types of nanotubes and nanofibers. The titanate nanotubes are prepared by hydrothermal treatment (advantageously at a temperature of between 110 and 145° C., typically 130° C.) of a TiO$_2$ powder in a strong base (typically NaOH) concentrated (typically 10 M) in an autoclave. Then, they are washed, dried and calcined at a temperature between 350 and 450° C. (typically 380° C.). According to an embodiment, 1 g of TiO$_2$ powder is added to 50 mL of a NaOH solution (10 M) in a Teflon® autoclave. The assembly is stirred for an hour, then left at 130° C. for 48 hours. The white powder obtained is then filtered under vacuum and washed with HCl (2 M) until neutral, rinsed in distilled water, then dried overnight at 110° C., and calcined at 380° C.

It is also possible to soak the carbide foam with this solution, to let it ripen, typically at 130° C., to wash with a HCl solution, to rinse with water, to dry and to calcinate; in this way titanate nanotubes can be produced directly onto the foam.

c) Deposition of the Photocatalyst

The photocatalyst can be deposited directly on the cellular foam or on the nanotubes or nanofibres prepared as described above. The photocatalytically active phase must comprise at least one semiconductor material in its chemical composition.

By semiconductor material, we mean, in the sense of this invention, a material in which the electronic states have a band spectrum including a valence band and a conduction band separated by a forbidden band, and where the energy necessary for passing an electron from said valence band to said conduction band is preferably between 1.5 eV and 4 eV. Such semiconductor materials can in particular include chalcogenides, and more specifically titanium oxide, or other metal oxides such as $WO_3$, $ZnO$ or $SnO_2$, or metal sulfides such as $CdS$, $ZnS$ or $WS_2$, or selenides such as $CdSe$, or other compounds such as $GaAs$ or $GaP$. According to this invention, it is preferable to use titanium oxide $TiO_2$, which leads to particularly satisfactory results, and which is inexpensive.

In the sense of this description, the term "photoactivated semiconductor material" refers to a semiconductor material of the type mentioned above that has been subjected to radiation including photons with energy levels higher than or equal to that necessary to promote the electrons from the valence band to the conduction band (so-called gap energy between the valence and conduction bands).

Thus, in the sense of this description, we particularly mean by "photoactivated titanium oxide" a titanium oxide subjected to radiation including photons with energy levels higher than or equal to that necessary to promote the electrons from the valence band to the conduction band, typically radiation containing photons with energy above 3 eV, and preferably 3.2 eV, and in particular radiation including wavelengths below or equal to 400 nm, for example below or equal to 380 nm. It is also possible to use visible light, if it enables the semiconductor material to be activated. This is the case of $TiO_2$, in rutile form, for example. If necessary, for example, for anatase $TiO_2$, it is possible to graft charge transfer elements onto the semiconductor; these can be chromophores and/or nanoparticles ("quantum dots"), of a second semiconductor material absorbing in the visible spectrum and capable of transferring the charge onto the first semiconductor. As an example, it is possible to use CdS nanoparticles (with a size typically between 2 and 10 nm). Another possibility for using $TiO_2$ in anatase form is to modify it by doping; the anatase allows for better quantum efficiency than the rutile form.

As radiation, it is possible to cite in particular the radiation provided by ultraviolet radiation lamps of the so-called black light lamps, or that provided by light emitting diodes (LED).

It is known that, in a photoactivated semiconductor material, and in particular in a photoactivated titanium oxide, electron/hole pairs (a hole being a lack of an electron in the valence layer, left by a jump of an electron to the conduction band) are created under the effect of radiation of the type mentioned above, which confers pronounced oxidation-reduction properties on the photoactivated semiconductor material. These oxidation-reduction properties are particularly pronounced in the case of photoactivated titanium oxide, which are used to advantage in numerous photocatalytic applications of titanium oxide.

The deposition of photocatalytic particles on cellular foam can be a discontinuous deposition of isolated photocatalytic particles, or it can consist of a more or less uniform coating covering a significant portion, and even the majority or entirety of the surface. The deposition of the photocatalytically active phase can be performed directly on the cellular foam, or on an intermediate coating deposited on said foam, for example of nanofibers or nanotubes. The photocatalytic particles can be composed of a single semiconductor, or they can consist of a mixture of phases, of which at least one is photocatalytic. Advantageously, the photocatalytic particles are $TiO_2$ (titanium dioxide); these particles can be doped.

According to the invention, the deposition of the photocatalytically active phase or its in situ synthesis (i.e. on the cellular carbide foam) can be performed by any suitable process. Below, we describe a plurality of deposition techniques, taking into account, as an example, a preferred active phase, $TiO_2$. It is understood that these techniques and processes can be adapted to other photocatalytically active phases, and in particular to other oxides and other chalcogenides.

According to a first method, crystallized particles are deposited, which are put in suspension in a suitable solvent, then they are spread on the substrate formed by the foam, for example by soaking the substrate. More specifically, the deposition can be obtained by impregnating the foam with a solution containing particles of the photocatalytically active phase in crystallized form, for example a chalcogenide (such as $TiO_2$). This impregnation is followed by drying in order to remove the solvent used in the impregnation. This method also allows to deposit nanofibres or nanotubes on the substrate.

According to a second method, the synthesis of $TiO_2$ can be performed directly on the foam, by impregnating it with a solution containing the $TiO_2$ precursor, according to a mode of synthesis called sol-gel synthesis. This process can be performed in different ways. In an advantageous embodiment, first, from a colloidal solution of an amorphous gel, essentially amorphous particles are deposited on the substrate formed by the foam, then it is dried and heated at a sufficient temperature and for a sufficient time (typically at a temperature comprised between 80° C. and 450° C., et preferably between 150° C. and 450° C.) to transform these amorphous particles into crystals.

In an advantageous embodiment of this method, the $TiO_2$ precursor is a titanium alkoxide, and preferably titanium isopropoxide. It will then be followed by a drying, then a calcination step; typically at a temperature comprised between 150° C. and 450° C., in order to crystallize the material in its $TiO_2$ form. This sol-gel technique can be applied to other metal oxides.

According to a third method, the synthesis of $TiO_2$ can also be performed directly on foam from a vapor phase containing a gaseous $TiO_2$ precursor, by causing a gas stream containing said $TiO_2$ precursor to pass. This precursor can be, for example, a titanium alkoxide or a titanium chloride. This process can be assisted by plasma, or it can take place without plasma. It is then followed by a drying, then a calcination step in order to crystallize the material in its $TiO_2$ form. This technique can be applied to other photocatalytically active semiconductors.

According to a fourth technique (called LBL for Layer-By-Layer), successive layers of polyelectrolytes are deposited. This technique is described conceptually in the article "Fuzzy Nanoassemblies: Toward Layered Polymeric Multicomposites" by Gero Decher, published in the journal Science, vol. 277, p. 1232-1237 (1997)). Advantageously, at least eight layers are deposited.

According to a fifth technique, photocatalytically active phase particles (such as $TiO_2$) are deposited by the Langmuir-Blodgett method, described as such in the article "Preparation and Organized Assembly of Nanoparticulate $TiO_2$-Stearate Alternating Langmuir-Blodgett Films" by Lin Song Li et al, published in the Journal of Colloid and Interface Science, vol. 192, p. 275-280 (1997), in the article "Preparation of a $TiO_2$ Nanoparticular Film Using a Two-Dimensional Sol-Gel Process" by I. Moriguchi et al, published in the journal Chem. Mater., (1997), p. 1050-1057, and in the article "Characterization of $TiO_2$ Nanoparticles in Langmuir-Blodgett Films" by P. J. G. Coutinho, published in the Journal of Fluorescence (2006), p. 387-392.

According to a sixth technique, $TiO_2$ or titanate nanotubes or nanofibres are formed on a cellular carbide foam, such as β-SiC foam. The typical diameter of these nanotubes or nanofibres ist comprised between about 10 and 20 nm. The specific surface of such a product can reach 300 and even 500 $m^2/g$. This specific surface is mainly due to the nanotubes or nanofibres, and is thus unrelated to porosity. It has been found that on a $TiO_2$ photocatalyst present as nanotubes or nanofibres, there is less recombination of photocarriers and thus a higher quantum yield of photocatalyzed reactions. Furthermore, due to its higher specific surface, additional phases, if needed, can be more finely dispersed on this photocatalyst. An appropriate method for the synthesis of nanofibres or nanotubes on cellular carbide foam is described in example 6 below. In a variant of this method, the material has been soaked after synthesis or deposition of nanofibres or nanotubes (see example 6) with a solution of a metal salt, such as a tungsten salt, and them calcinated as described above. In this way, coupled TiO2/SiC/metal oxide photocatalysts can be obtained. $WO_3$ is particularly appropriate.

The exact nature of the active phase used according to the invention to develop photocatalytic properties, insofar as it comprises at least one material activated by light radiation, is, as a general rule, not an influencing factor for producing a reaction or a carrying out a photocatalytic process.

Thus, in the case of titanium oxide, for example, any titanium oxide developing photocatalytic properties and capable of being anchored in the form of particles or a coating on the foam can be used effectively in the process of the invention, which constitutes another advantage of the process.

Nevertheless, according to an embodiment, the titanium oxide used according to the process of the invention contains anatase $TiO_2$, preferably in an amount of at least 50%. Thus, according to this embodiment, the titanium oxide used can, for example, essentially (i.e., in general, for at least 99% by weight, preferably for at least 99.5% by weight, and even at least 99.9% by weight) be made up of anatase $TiO_2$.

The use of rutile $TiO_2$ is also valuable, insofar as the $TiO_2$ in this form is photoactivated by the visible light spectrum.

According to another advantageous embodiment, the titanium oxide used includes a mixture of anatase $TiO_2$ and rutile $TiO_2$, preferably with an anatase/rutile weight proportion of between 50/50 and 99/1, for example between 70/30 and 90/10, and typically on the order of 80/20.

In addition, in particular to optimize the exchanges between the titanium oxide semiconductor material and the reaction flow, it is usually advantageous for the semiconductor material used to have a specific surface of between 2 and 500 $m^2/g$, preferably greater than or equal to 20 $m^2/g$, and even more advantageously at least equal to 50 $m^2/g$, in particular when it is titanium oxide.

The photoactivated semiconductor material that is used according to the invention can be in various physical forms, depending on the medium treated, and in particular depending on the volume of this medium and the rate at which the process is to be implemented. In general, the titanium oxide semiconductor material can be used in any form suitable for its irradiation by radiation with a wavelength enabling its photoactivation and enabling the titanium oxide to be placed in contact in the photoactivated state with molecules of the reaction flow, on the condition that it is accessible.

d) Use in Photocatalysis

A plurality of types of photocatalytic reactors can advantageously be used. It is possible to introduce one or more foam parts, for example with a cylindrical shape, in a casing element forming a liquid- and gas-tight wall, in which said casing element is transparent or not, through which the reaction medium passes. Said casing element can be a tubular element. In the case of a transparent casing element, the light can come from outside (i.e. by an external lamp), while in the case of an opaque casing element, the light must come from inside (for example, an internal lamp, or by LED diodes, or by quantum dot devices), or must be brought inside by optical fibers. A plurality of such casing elements, for example tubular elements, can be arranged in parallel, optionally using a common light source (in particular in the case of transparent tubes). It is also possible to use a multiple channel reactor, in which each channel consists of at least one tubular element, and the reactor is provided with solenoid valves enabling the reaction medium flow to be switched to at least one tubular element(s), and the other (or others) can be regenerated or exchanged while the other(s) are operating.

In another embodiment, a reactor, typically tubular, with a larger diameter, for example between 10 and 100 cm is used, in which one or more cylindrical foam parts, as well as a plurality of light sources are introduced; the latter are introduced in these foam parts, typically in the form of tubular lamps with an elongate shape (typically approximately cylindrical) or optical fibers oriented so as to be parallel in the lengthwise direction of said tubular element. The foam parts advantageously have a cylindrical shape; they can have a ring shape.

Figure 2:
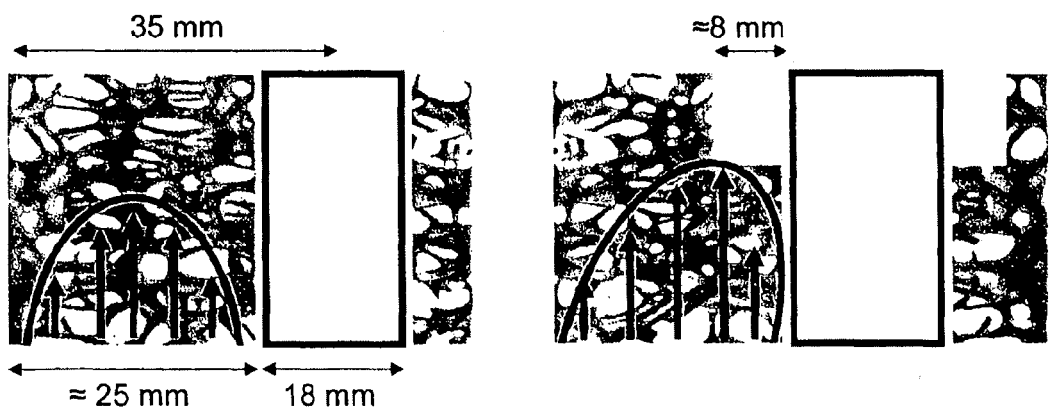
FIG. 2 shows the sides of the cylindrical rings of these reactors, as well as a particle speed profile.

In an advantageous embodiment of a photocatalytic reactor according to the invention, foam rings having different alternating internal diameters are introduced into a tubular element. FIG. 1(b) diagrammatically shows this shape for a configuration comprising 13 cylindrical foam rings, alternatively 7 cm in external diameter and 2 cm in thickness; FIG. 2 shows the sides. At the center of the rings is a longitudinal light source. FIG. 1(a) shows, by way of comparison, a reactor with cylindrical foam rings of the same diameter. The speed profile in the two reactors was calculated for a gas or liquid flow; the result is provided in FIG. 2. It is thus noted that the speed profile of the particles is asymmetrical when the internal diameter of the rings is not the same (the case of FIG. 1(b)). It is due to this asymmetry that a larger part of the flow passes into the lighter areas: such a reactor has a higher conversion rate than a reactor of which the internal diameter is constant. A reactor filled with alternating foams can be preferred to the same reactor integrally filled with foam over the entire length thereof.

This enables the amount of light received at each point of the foam to be increased overall, which can, in the case of an appropriate choice of alternation of foams, compensate for the reduction in the amount of foam, and therefore the amount of photocatalytically active phase inside the reactor.

Figure 3:
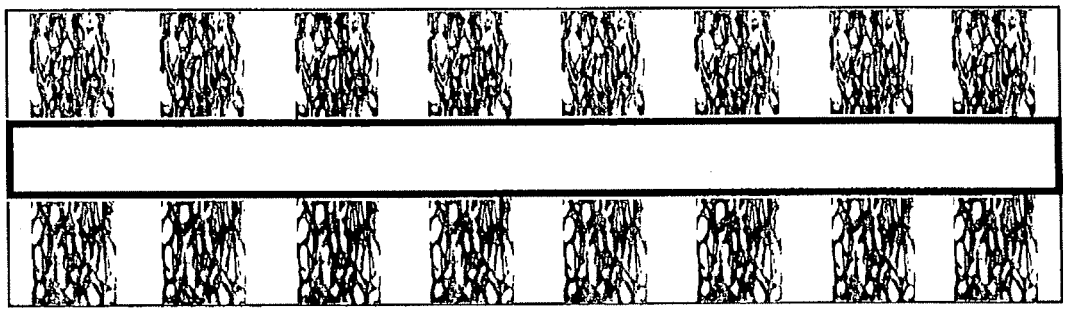
FIG. 3 shows an example of a reactor having a structured configuration in alternation with 8 equidistant foam elements.

In an embodiment diagrammatically shown in FIG. 3, the space left available by the removal of a certain number of foams of the reactor is distributed over the entire reactor, so that the foams are equidistant inside the reactor. The equidistance is not, however, an absolute necessity.

The photocatalyst according to the invention is suitable for gaseous or liquid phase reactions, for reactions such as oxidation (for example oxidation of alcohol or oxidation of CO into $CO_2$), reduction, reforming, decomposition (for example of harmful volatile organic compounds (VOC)), hydrogenation and/or dehydrogenation of hydrocarbons or organic compounds, and photolysis of water or reforming of alcohols such as methanol. It is also suitable for partial oxidations of organic molecules. It is also suitable for oxidation of molecules containing heteroatoms such as sulfur, phosphorus and nitrogen. Among the sulfur molecules, we can cite diethyl sulfur, dimethyl sulfur, $H_2S$ and $SO_2$. Among the phosphorus molecules, we can cite the organophosphorus molecules, such as dimethyl methylphosphonates. Among the nitrogen molecules, we can cite methylamines and acetonitrile. It is also suitable for reactions enabling a nitrogen oxide treatment ($NO_x$).

The photocatalyst according to the invention can also be used as a filter in order to filter biological agents, such as bacteria, viruses or any other similar compound in a liquid or gas phase. This filtration activity is advantageously accompanied by a photocatalytic activity. The cellular foams according to the invention only partially retain these small objects, but their filtering effect is sufficient in order to lead to an increase in the residence time so that the photocatalytic reaction is more effective. In the case of biological agents, the photocatalytic activity leads to cell death: such a filter at least partially retains the biological agents and releases inactivated biological agents.

As an example, such a reactor can be installed very simply at the inlet of air conditioning or air intake ducts of buildings or vehicles. It can also be used to purify gaseous or liquid effluents.

e) Use for Biological Decontamination

The photocatalyst according to the invention can be used to inactivate or degrade biological agents. We already know bacteria filters based on PU foam (see the article "Potential of Silver Nanoparticle-Coated Polyurethane Foam as an Antibacterial Water Filter" by P. Jain and T. Pradeep, published in the journal Biotechnology and Bioengineering, vol. 90(1), April 2005, p. 59-62). But this does not relate to a catalytic process, because the foam is covered with silver nanoparticles, of which the bactericidal effect is already known.

According to the invention, a photocatalytic method is used to destroy biological agents, which can also be viruses, bacteria, bacterial spores, allergens, fungal spores contained in gaseous or liquid fluids. The advantage of this photocatalytic filter is its low head losses, even for high thicknesses (on the order of one dozen to one hundred centimeters). This enables fluids to be treated with high flow rates (or linear speeds), while ensuring a filtration activity and a photocatalytic activity in the volume. However, most known photocatalytic media have serious limitations. As an example, two-dimensional filtration media, such as felts, papers and woven fabrics do not enable deep penetration of the material retained by the filter in the filtration medium, and cannot be used in the presence of aggressive media.

The presence of nanotubes or nanofibres, en more generally of one-dimensional nanostructures, increases the filtration capacity of the inventive photocatalyst, without a significant increase in head losses.

f) Advantages of the Invention

The use of three-dimensional cellular foams as a photocatalyst support enables a certain number of limitations encountered to be overcome for most existing substrates or photocatalytic media, namely:

(i) use in a cross-flow with minimal head losses at a high flow rate (or linear speed), (ii) good light transmission, which can be adjusted by adjusting the size of the cells, (iii) close contact with the reaction medium (gas or liquid flow) to be treated, due to increased turbulence in contact with the three-dimensional foam, (iv) use of a three-dimensional medium enables an increased contact distance with the reaction medium when working in a cross-flow (for example, approximately perpendicular to the cross-section of the foam), while in a classic tubular reactor in cross-bed mode, and in particular under the conditions of a piston reactor, the contact distance, i.e. the distance over which there can be contact between the flow and the catalytic coating of the reactor, typically corresponds to the length of the reactor, (v) the coupling of photocatalytic properties of the foam with its filtration properties, in which the latter can be adjusted according to the cell size, (vi) in general, flexibility in adaptation, modulation and spatial arrangement of these foams, in order to adapt them to the various environments in which they will be used.

The photocatalyst according to the invention can be produced in the form of a regenerable cartridge.

EXAMPLES OF EMBODIMENTS

These examples are provided as illustrations to enable a person skilled in the art to produce the invention. They specify specific embodiments of the invention and do not limit its scope.

Example 1

Optical Transmission of Foams Used for Implementation of the Invention

We provided a β-SiC foam (supplier: SICAT) with an average cell size of 4500 μm. We determined the optical transmission of blocks of various thicknesses with a light transmitted by a diode with a wavelength of 455 nm. To do these measurements, we used a block in the form of a disk that rotated around an axis. The surface of the completely illuminated detector was 1 $cm^2$. The value measured was an average value taken on different orientations of the foam. The results are summarized in table 1.

TABLE 1

| β-SiC foam (average cell size: 4500 μm) | | | | | | |
|---|---|---|---|---|---|---|
| Thickness [cm] | 0 | 0.7 | 1.25 | 1.81 | 2.5 | 3 |
| Transmission [%] | 100 | 45 | 21 | 8 | 6 | 2 |

Example 2

Deposition of a Photocatalyst on a β-SiC foam

A β-SiC foam in the form of rings was prepared from a commercial polyurethane (PU) foam with a cell size of around 4800 μm. These PU foams were cut in the form of cylinders with an external diameter of 4.2 cm (after impregnation with the phenolic resin, the diameter of the cylinder had increased to reach 5.0 cm), which were then perforated so as to obtain a foam in the form of rings (internal diameter of 3.0 cm). During the pyrolysis treatment, the foam was subjected to shrinkage, and the carbonated foam ring then had an external diameter of 4.0 cm and an internal diameter of 2.0 cm.

The photocatalyst was deposited on the β-SiC rings by the so-called "aqueous" mode: The rings were soaked in an aqueous suspension of the photocatalyst (for example $TiO_2$) under magnetic stirring.

In an alternative of the process, the β-SiC foam was subjected to an oxidizing treatment, for example at 900 to 1000° C. for 2 to 5 hours under air, to create a $SiO_2$-type phase at the surface of the SiC foams; then, the photocatalyst was deposited as described above.

Example 3

Photocatalytic Tests

In a tubular reactor (similar to that described in the publication "Photocatalytic oxidation of butyl acetate on vapor phase on $TiO_2$, $Pt/TiO_2$ and $WO_3/TiO_2$ catalysts" by V. Keller et al., Journal of Catalysis, vol. 215, pages 129-138 in 2003), catalytic tests were performed on different foams according to the invention, according to two different modes, referred to here as "structured reactor" (using a cellular foam according to the invention) and (for the purpose of comparison) "classic tubular reactor" in which the photocatalyst is deposited directly on the internal wall of the reactor. All of the experiments were performed in a dry flow.

For both modes:

The external envelope of the photoreactor was a Pyrex tube with a length of 300 mm and a diameter of 42 mm, at the center of which the light source was located, namely a black light lamp, providing UV-A light with a power of 8 W (Philips).

The tests were conducted as follows:

The incoming flow was stabilized in terms of methanol by-pass concentration and flow rate. Then the same flow was switched to the photoreactor, in the dark (more or less long according to experimental conditions), during which the methanol was absorbed on the catalyst, the flow was returned to its initial value, and the UV-A lamp was then turned on. The photocatalytic performances were then monitored by gas microchromatography.

Due to the flows used and the volume of the photoreactor (internal volume of the Pyrex tube from which the volume occupied by the lamp is subtracted), the linear speed of the gas flow was 8 cm/s.

A dry air flow with a flow rate of 4.32 L/min, with a methanol concentration of 1200 ppm (volumetric), was used. To do this, an air flow (flow rate of 40 mL/min) was passed through a saturator containing liquid methanol (Carlo Erba, purity>99.9%) at a temperature of 20° C. The air flow was filled with methanol, then diluted in a dry air flow carrier (flow rate of 4.28 L/min). The total flow then had a flow rate of 4.32 L/min.

The photocatalytic tests in "structured reactor" mode according to the invention were performed in order to oxidize the methanol into $CO_2$ in the absence of water in the reaction flow (dry flow).

The comparative tests with a "classic tubular (annular) reactor" were performed as follows:

The desired amount of powdered $TiO_2$ was suspended in an ethanol/water (50/50 by volume) solution and subjected to ultrasound for 4 hours at room temperature (between 1 g and 4 g in 40 mL of solution). The suspension was then dispersed over the internal surface of the tubular reactor in a step, with simultaneous drying with a hair dryer. A final drying was performed in the oven air at 100° C. for 12 hours.

The following results were obtained with a photocatalyst deposited on cellular βSiC foam according to the invention. With the classic tubular reactor:

| Mass [g] | 0.5 | 1 | 2 | 3 | 4 |
|---|---|---|---|---|---|
| Methanol conversion [%] | 12 | 16 | 23 | 24 | 25 |

With the structured reactor:

| Mass [g] | 0.8 | 3.5 | 7 |
|---|---|---|---|
| Methanol conversion [%] | 26 | 40 | 52 |

Example 4

Deposition of Photocatalyst "Layer-by-Layer"

On cellular β-SiC foams (cell size about 4800 μm, mass of pieces about 3 g), $TiO_2$ layers were successively deposited according to the following procedure:

The substrate (foam) was soaked in a PEI (polyethyleneimine) solution for 20 minutes (PEI concentration of 8.24 g/L). We then soaked the substrate in 40 mL of a $TiO_2$ solution P25 (water: ethanol at 50:50 v/v, in an amount of 10 g of P25/L, pH=8) for 20 minutes. This step was followed by two soaking (washing) steps for 10 minutes in distilled water (40 mL). Each step took place under orbital stirring.

A plurality of layers were then deposited. These foams shoed catalytic performances similar to those tried in example 3.

Example 5

Deposition of Photocatalyst by Vapor Phase

We deposited, from a gas phase (CVD method), a titanium precursor on different types of foams. We first provided an ethanol-filled air flow for 1 hour under a vacuum of 60 mbar. We then provided a TTIP vapor-filled air flow for 3 hours under a vacuum of 60 mbar. Finally, we provided a water vapor-filled air flow for 4 hours under a vacuum of 60 mbar.

Example 6

Synthesis of $TiO_2$ or Titanate Nanotubes or Nanofibers

A quantity of 0.5 g of a commercial $TiO_2$ powder was first dispersed in 90 mL of concentrated soda (10 M) in a Teflon autoclave (volume 100 mL) for 4 hours; the suspension obtained was subjected to ultrasound for 20 minutes. A cellular SiC foam part (0.8 g, average cell size 4800 μm) was added to the suspension and heated at 130° C. for 72 hours. The foam was then dispersed in 200 mL of distilled water for 2 hours, then impregnated in an HCl solution (1 M) for 2 hours before being rinsed well with distilled water, then dried at 110° C. for 1 hour. Calcination under air at 380° C. for 2 hours was then performed (with a temperature increase of 2° C./minute).

In an alternative of this process, the material dried at 110° C. was impregnated with an ammonium paratungstate solution, then calcined as described above. A combined photocatalyst $WO_3/TiO_2/SiC$, was thus obtained.

Example 7

Photocatalytic Tests

The following results were obtained (a) with a photocatalyst deposited on cellular β-SiC foam according to the invention ("structured reactor") and (b) with a photocatalyst deposited directly on the internal wall of the reactor:
a) With the Structured Reactor:
The length of the SiC foam used for the reaction was 20 mm.
The mass of $TiO_2$ used was optimized; it is the optimal amount of $TiO_2$ that can be used in said structured reactor on a length of 20 mm of SiC foam.

| Dry air flow rate | Speed | Residence time | Volumetric methanol concentration | Mass [g] | Methanol conversion [%] |
|---|---|---|---|---|---|
| 0.36 L/min | 0.7 cm/s | 2.93 s | 1200 ppm | 0.3 g | 100% |
| 1 L/min | 1.9 cm/s | 1.06 s | 1200 ppm | 0.3 g | 100% |
| 4 L/min | 7.6 cm/s | 0.26 s | 1200 ppm | 0.3 g | 40% |
| 4 L/min | 7.6 cm/s | 0.26 s | 250 ppm | 0.3 g | 100% |
| 6 L/min | 11.4 cm/s | 0.18 s | 120 ppm | 0.3 g | 47% | b) With the Classic Tubular Reactor:
The length of the $TiO_2$ coating used for the reaction was 20 mm.
The mass of $TiO_2$ used was optimized; it is the optimal amount of $TiO_2$ that can be used in said structured reactor on a length of 20 mm.

| Dry air flow rate | Speed | Residence time | Volumetric methanol concentration | Mass [g] | Methanol conversion [%] |
|---|---|---|---|---|---|
| 0.36 L/min | 0.7 cm/s | 2.93 s | 1200 ppm | 0.0025 g | 46% |
| 1 L/min | 1.9 cm/s | 1.06 s | 1200 ppm | 0.0025 g | 6% |
| 4 L/min | 7.6 cm/s | 0.26 s | 1200 ppm | 0.0025 g | <1% |
| 4 L/min | 7.6 cm/s | 0.26 s | 250 ppm | 0.0025 g | 5% |
| 6 L/min | 11.4 cm/s | 0.18 s | 120 ppm | 0.0025 g | 3% |

This example shows in particular that the benefit of using the foams is increased with respect to the classic tubular reactor as the flow rate increases (which also corresponds to an increase in the speed in m/s).

Example 8

Photocatalytic Tests

The following results were obtained (a) with a photocatalyst deposited on cellular β-SiC foam according to the invention ("structured reactor") and (b) with a photocatalyst deposited directly on the internal wall of the reactor:
a) With the Structured Reactor:
The length of the SiC foam used for the reaction was 220 mm.
The mass of $TiO_2$ used was optimized; it is the optimal amount of $TiO_2$ that can be used in said structured reactor on a length of 220 mm of SiC foam.

| Dry air flow rate | Speed | Residence time | Volumetric methanol concentration | Mass [g] | Methanol conversion [%] |
|---|---|---|---|---|---|
| 4.3 L/min | 8.1 cm/s | 2.7 s | 1200 ppm | 2.97 g | 100% |
| 6 L/min | 11.3 cm/s | 1.9 s | 1200 ppm | 2.97 g | 80% |
| 6 L/min | 11.3 cm/s | 1.9 s | 5000 ppm | 2.97 g | 73% |
| 6 L/min | 11.3 cm/s | 1.9 s | 13000 ppm | 2.97 g | 45% |
| 8.5 L/min | 16.1 cm/s | 1.4 s | 1200 ppm | 2.97 g | 20% | b) With the Classic Tubular Reactor:
The length of the $TiO_2$ coating used for the reaction was 220 mm.
The mass of $TiO_2$ used was optimized.

| Dry air flow rate | Speed | Residence time | Volumetric methanol concentration | Mass [g] | Methanol conversion [%] |
|---|---|---|---|---|---|
| 4.3 L/min | 8.1 cm/s | 2.7 s | 1200 ppm | 0.026 g | 46% |
| 6 L/min | 11.3 cm/s | 1.9 s | 1200 ppm | 0.026 g | <1% |
| 6 L/min | 11.3 cm/s | 1.9 s | 5000 ppm | 0.026 g | <1% |
| 6 L/min | 11.3 cm/s | 1.9 s | 13000 ppm | 0.026 g | <1% |
| 8.5 L/min | 16.1 cm/s | 1.4 s | 1200 ppm | 0.026 g | <1% |

This example shows in particular that the benefit of using the foams is increased with respect to the classic tubular reactor as the flow rate increases (which also corresponds to an increase in the speed in m/s).

Example 9

Study of the Influence of Cell Size on Photocatalytic Performance

The following results were obtained with a photocatalyst deposited on cellular βSiC foam according to the invention, with the following parameters:

Dry air flow rate=0.4 L/min; Speed=0.8 cm/s; Residence time=29 s; Reactor length=22 cm; Volumetric methanol concentration: 1200 ppm; $TiO_2$: P25 Degussa (Evonik).

The following results were obtained with an optimized $TiO_2$ on the cellular β-SiC foams:

| Test 1 | Average cell size: 4400 microns | $TiO_2$ mass [g] | 2.97 |
| | | Foam length [cm] | 22 |
| | | Methanol conversion [%] | 100 |

| Test 2 | Average cell size: 2700 microns | $TiO_2$ mass [g] | 3.5 |
| | | Foam length [cm] | 22 |
| | | Methanol conversion [%] | 36 |

| Test 3 | Average cell size: | TiO₂ mass [g] | 2.98 |
| --- | --- | --- | --- |
| | 4900 microns | Foam length [cm] | 22 |
| | | Methanol conversion [%] | 76 |

This example shows the superiority of the cellular foam of test 1 over that of tests 2 and 3. This difference is due solely to the average cell size.

Example 10

Specific Geometries

To improve illumination and promote the passage of the flow into the most illuminated areas, a tubular reactor was produced according to a configuration based on the alternation of foams of different internal diameters. A configuration with 13 cylindrical foam rings of identical shape and dimensions, 7 cm in external diameter and 2 cm in thickness was assembled; FIG. 1(a) diagrammatically shows this geometry; FIG. 2(a) shows the sides. At the center of the rings is a longitudinal light source. A reactor with cylindrical foam rings with an alternatively different internal diameter (see FIG. 1(b) for the principle and FIG. 2(b) for the sides) was also produced. Such a reactor has a higher conversion rate than a reactor in which the internal diameter is constant. The speed profile in the two reactors for a gas or liquid flow was calculated; the result is provided in FIGS. 2(a) and (b). It is noted that the speed profile of the particles is asymmetric when the internal diameter of the rings is not the same (case of FIG. 1(b)). It is due to this asymmetry that a larger portion of the flow passes into the most illuminated areas.

This configuration (FIG. 1(b)) may be preferred to a geometry in which the reactor would integrally be lined with foam (FIG. 1(a)) since it makes it possible to promote the passage of the flow to the more illuminated areas, i.e. toward the lamp (FIG. 2).

Example 11

Specific Geometries

A tubular reactor filled with alternating foam rings was prepared, in which a space was provided between all or some adjacent rings, by removing at least one ring. The space left by the removal of a certain number of foams from the reactor can be distributed over the entire reactor, so that the foams are equidistant inside the reactor, but equidistance is not an absolute requirement.

FIGS. 3(a), (b) and (c) show examples for such embodiments, with 1 ring (c), 4 equidistant rings (b) and 8 equidistant rings (a).

The performance of a reactor comprising a photocatalyst deposited on cellular SiC foam according to the invention was compared with and without an interannular space, for the photocatalytic oxidation of gaseous methane. The TiO₂ mass on each SiC foam was optimized. The volumetric methanol concentration at the inlet was 5000 ppm. The dry air flow rate was 6 L/min.

| Number of rings | Speed [cm/s] | Residence time in the foam [s] | Residence time in the reactor [s] | Foam length used [cm] | Distance between rings [cm] | TiO2 mass [g] | Methanol conversion [%] |
| --- | --- | --- | --- | --- | --- | --- | --- |
| 6 | 11.3 | 1.9 | 1.9 | 12 | 2 | 1.6 | 15.3 |
| 6 | 11.3 | 1.9 | 1.0 | 12 | 0 | 1.6 | 10.0 |

This example shows the benefit of an alternating configuration.

The invention claimed is:

1. A photoreactor, comprising:
   a photocatalyst, the photocatalyst comprising a cellular β-SiC foam having cells and a photocatalytically active phase deposited directly on said cellular β-SiC foam or on an intermediate phase deposited on said cellular β-SiC foam,
   wherein the average size of the cells is between 2500 μm and 5000 μm;
   the photoreactor further comprising a liquid-tight and gas-tight casing element, at least one part of the photocatalyst having a ring shape located inside said casing element, and at least one light radiation source;
   wherein the photocatalyst comprises a plurality of annular parts, said annular parts having an internal diameter that is alternatively different, so that all of the even-numbered parts have the same internal diameter $d_1$, and all of the odd-numbered parts have the same internal diameter $d_2$, and said light radiation source is located in the internal diameter of said annular parts.

2. The photoreactor according to claim 1, wherein said annular parts are separated by an empty space or a part that is optically transparent to at least a portion of said light radiation used.

3. The photoreactor according to claim 1, wherein the average size of the cells is between 3000 μm and 5000 μm.

4. The photoreactor according to claim 1, wherein said cellular β-SiC foam has a specific surface of at least 5 m²/g and a density of between 0.1 g/cm³ and 0.4 g/cm³.

5. The photoreactor according to claim 4, wherein the photocatalyst has, in a visible spectrum of between 400 nm and 700 nm, an optical transmission of at least 10% for the foam with a thickness of 1.5 cm.

6. The photoreactor according to claim 5, wherein said foam further comprises nanotubes or nanofibers which support as an intermediate phase the photocatalytically active phase, wherein said nanotubes or nanofibers are selected from the group consisting of carbon, SiC, TiO₂ and titanates.

7. The photoreactor according to claim 6, wherein said photocatalytically active phase is selected from the group consisting of metal oxides, titanates, metal sulfides, selenides, type III-V semiconductors, and SiC.

\* \* \* \* \*